United States Patent
Hashimoto

(10) Patent No.: US 12,145,589 B2
(45) Date of Patent: Nov. 19, 2024

(54) CONTROLLER FOR VEHICLE, COMPUTER-READABLE MEDIUM STORING CONTROL PROGRAM FOR VEHICLE, AND CONTROL METHOD FOR VEHICLE

(71) Applicants: ADVICS CO., LTD., Kariya (JP); J-QUAD DYNAMICS INC., Tokyo (JP)

(72) Inventor: Yosuke Hashimoto, Kariya (JP)

(73) Assignees: ADVICS CO., LTD., Kariya (JP); J-QuAD DYNAMICS INC., Tokyo (JP)

( * ) Notice: Subject to any disclaimer, the term of this patent is extended or adjusted under 35 U.S.C. 154(b) by 107 days.

(21) Appl. No.: 17/496,279

(22) Filed: Oct. 7, 2021

(65) Prior Publication Data

US 2022/0111846 A1     Apr. 14, 2022

(30) Foreign Application Priority Data

Oct. 12, 2020 (JP) ................................ 2020-171772

(51) Int. Cl.
*B60W 30/18* (2012.01)
*B60W 10/18* (2012.01)
(Continued)

(52) U.S. Cl.
CPC ...... *B60W 30/18145* (2013.01); *B60W 10/18* (2013.01); *B60W 10/20* (2013.01); *B60W 50/0205* (2013.01); *B62D 7/14* (2013.01)

(58) Field of Classification Search
CPC .......... B60W 30/18145; B60W 10/18; B60W 10/20; B60W 50/0205; B62D 7/14
See application file for complete search history.

(56) References Cited

U.S. PATENT DOCUMENTS

2003/0060959 A1*  3/2003  Lin .................... B60T 8/1755
                                                          701/70
2007/0029126 A1    2/2007  Shigeta et al.
(Continued)

FOREIGN PATENT DOCUMENTS

CN    104470775 A    3/2015
CN    107709139 A    2/2018
(Continued)

OTHER PUBLICATIONS

Office Action (First Office Action Notification) issued May 13, 2023, by the National Intellectual Property Administration, P. R. China in corresponding Chinese Patent Application No. 202111162344.9 and an English translation of the Office Action. (15 pages).

(Continued)

*Primary Examiner* — Jaime Figueroa
*Assistant Examiner* — Jamal A Shah
(74) *Attorney, Agent, or Firm* — BUCHANAN, INGERSOLL & ROONEY PC

(57) ABSTRACT

A controller for a vehicle is configured to execute a process that detects an anomaly of a steering device and a process that performs an automatic turning control that causes the vehicle to turn automatically along a traveling route. The controller is configured to perform the automatic turning control by controlling the steering device when an anomaly of the steering device is not detected. The controller is configured to, when an anomaly of the steering device is detected, calculate, as a predicted value, a load on the substitute device on an assumption that the automatic turning control is performed by activating the substitute device, and perform the automatic turning control by controlling the substitute device when an allowable range that is a set of values of a load allowable to the substitute device includes the predicted value.

5 Claims, 3 Drawing Sheets

(51) Int. Cl.
*B60W 10/20* (2006.01)
*B60W 50/02* (2012.01)
*B62D 7/14* (2006.01)

(56) References Cited

U.S. PATENT DOCUMENTS

| | | | |
|---|---|---|---|
| 2012/0109410 A1* | 5/2012 | Hanzawa | B60W 30/02 |
| | | | 701/1 |
| 2015/0120144 A1 | 4/2015 | De Bruin et al. | |
| 2016/0090100 A1 | 3/2016 | Oyama et al. | |
| 2018/0229738 A1* | 8/2018 | Nilsson | B60W 50/0205 |
| 2019/0039603 A1 | 2/2019 | Hashimoto | |
| 2020/0039580 A1 | 2/2020 | Redeker et al. | |
| 2020/0207410 A1 | 7/2020 | Yamamoto | |
| 2020/0377150 A1 | 12/2020 | Hidaka et al. | |

FOREIGN PATENT DOCUMENTS

| | | |
|---|---|---|
| JP | H0558322 A | 3/1993 |
| JP | 2007038798 A | 2/2007 |
| JP | 2011218988 A | 11/2011 |
| JP | 2012232676 A | 11/2012 |
| JP | 2016068704 A | 5/2016 |
| JP | 2016068705 A | 5/2016 |
| JP | 2017132388 A | 8/2017 |
| JP | 2018161917 A | 10/2018 |
| JP | 2020019456 A | 2/2020 |
| JP | 2020104540 A | 7/2020 |

OTHER PUBLICATIONS

Office Action (Notice of Reasons for Refusal) issued on Jul. 2, 2024, in corresponding Japanese Patent Application No. 2020-171772 and English translation of the Office Action. (12 pages).

\* cited by examiner

CONTROLLER FOR VEHICLE, COMPUTER-READABLE MEDIUM STORING CONTROL PROGRAM FOR VEHICLE, AND CONTROL METHOD FOR VEHICLE

BACKGROUND

1. Field

The present disclosure relates to a controller for a vehicle that causes a vehicle to turn automatically, a computer-readable medium storing a control program for a vehicle, and a control method for a vehicle.

2. Description of Related Art

Japanese Laid-Open Patent Publication No. 2012-232676 discloses a vehicle controller that performs steering automatically. The controller disclosed in the above-described publication is configured to continue to perform automatic steering using a substitute device when there is an anomaly in a steering device that changes the steered angle of wheels.

As in the case of the controller disclosed in the above-described publication, automatic steering can be continued by activating another device as a substitute device in place of a steering device in which there is an anomaly. In such a case, the load on the substitute device may increase due to extended activation time of the substitute device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a controller for a vehicle is provided. The vehicle includes a wheel, a driving device that transmits a driving force to the wheel, a steering device that controls a steered angle of the wheel, and a braking device that applies a braking force to the wheel. The controller includes processing circuitry configured to execute: an anomaly detecting process that detects an anomaly of the steering device; and a process that performs an automatic turning control that causes the vehicle to turn automatically along a traveling route. At least one of the braking device and the driving device is a substitute device configured to be activated in place of the steering device. The process that performs the automatic turning control includes performing the automatic turning control by controlling the steering device when an anomaly of the steering device is not detected. The process that performs the automatic turning control includes, when an anomaly of the steering device is detected, calculating, as a predicted value, a load on the substitute device on an assumption that the automatic turning control is performed by activating the substitute device, and performing the automatic turning control by controlling the substitute device when an allowable range that is a set of values of a load allowable to the substitute device includes the predicted value.

In another general aspect, a computer-readable medium storing a control program executed by a controller for a vehicle is provided. The vehicle includes a wheel, a driving device that transmits a driving force to the wheel, a steering device that controls a steered angle of the wheel, and a braking device that applies a braking force to the wheel. The control program is configured to cause the controller to execute: an anomaly detecting process that detects an anomaly of the steering device; and a process that performs an automatic turning control that causes the vehicle to turn automatically along a traveling route. At least one of the braking device and the driving device is a substitute device configured to be activated in place of the steering device. The process that performs the automatic turning control includes performing the automatic turning control by controlling the steering device when an anomaly of the steering device is not detected. The process that performs the automatic turning control includes, when an anomaly of the steering device is detected, calculating, as a predicted value, a load on the substitute device on an assumption that the automatic turning control is performed by activating the substitute device, and performing the automatic turning control by controlling the substitute device when an allowable range that is a set of values of a load allowable to the substitute device includes the predicted value.

In a further general aspect, a control method for a vehicle is provided. The vehicle includes a wheel, a driving device that transmits a driving force to the wheel, a steering device that controls a steered angle of the wheel, and a braking device that applies a braking force to the wheel. The control method includes: detecting an anomaly of the steering device; and performing an automatic turning control that causes the vehicle to turn automatically along a traveling route. At least one of the braking device and the driving device is a substitute device configured to be activated in place of the steering device. The performing the automatic turning control includes causing the vehicle to turn automatically along the traveling route by controlling the steering device when an anomaly of the steering device is not detected. The performing the automatic turning control includes, when an anomaly of the steering device is detected, calculating, as a predicted value, a load on the substitute device on an assumption that the vehicle is caused to turn automatically along the traveling route by activating the substitute device, and causing the vehicle to turn automatically along the traveling route by controlling the substitute device when an allowable range that is a set of values of a load allowable to the substitute device includes the predicted value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described.

Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller 10 for a vehicle according to an embodiment will now be described with reference to FIGS. 1 to 5.

Figure 1:
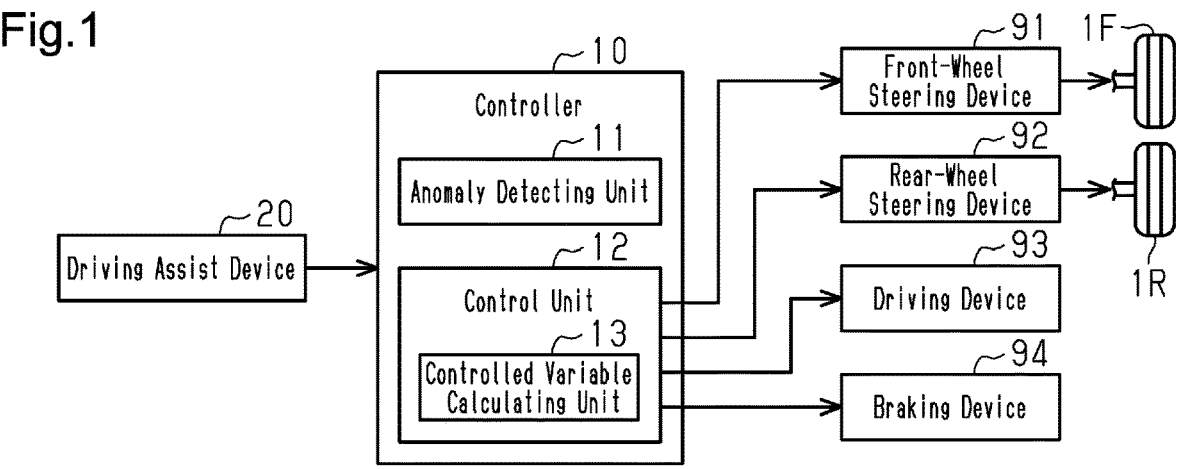
FIG. 1 is a block diagram showing a vehicle controller according to an embodiment and a vehicle to be controlled by the controller.

FIG. 1 shows a vehicle controlled by the controller 10. The vehicle includes a four-wheel steering mechanism, which is capable of steering wheels including front wheels 1F and rear wheels 1R. The four-wheel steering mechanism includes a front-wheel steering device 91 and a rear-wheel steering device 92. The front-wheel steering device 91 is a device that controls a steered angle of the front wheels 1F. The rear-wheel steering device 92 is a device that controls a steered angle of the rear wheels 1R. The four-wheel steering mechanism is capable of changing the steered angle of the front wheels 1F and the steered angle of the rear wheels 1R separately.

The vehicle includes a driving device 93, which transmits driving force to the wheels. The driving device 93 includes an internal combustion engine, which is a drive source, and a transmission. The driving device 93 includes a driving force transmitting device such as a differential gear. The driving device 93 transmits the driving force to the front wheels 1F. The drive source of the driving device 93 is not limited to an internal combustion engine. For example, the drive source may be a motor-generator. The drive source may be a combination of an internal combustion engine and a motor-generator. Also, the driving device 93 may be configured to transmit the driving force to the rear wheels 1R, or may be configured to transmit the driving force to the front wheels 1F and the rear wheels 1R.

The vehicle includes a braking device 94, which applies braking force to the wheels. The braking device 94 is capable of regulating the braking force applied to the respective wheels. The braking device 94 may be, for example, a friction braking device that presses a frictional member against a rotor that rotates integrally with a wheel, thereby applying, to the wheel, braking force in correspondence with the force with which the frictional member is pressed. One example of the friction braking device applies braking force to the wheel by pressing a frictional member against a rotor in correspondence with the magnitude of hydraulic pressure generated by a hydraulic pressure generator. The friction braking device may apply braking force to the wheel by pressing a frictional member actuated by an electric motor against a rotor.

The vehicle includes a driving assist device 20. The driving assist device 20 includes an acquisition device that acquires information of the surrounding of the vehicle. The acquisition device includes, for example, cameras and radars. The acquisition device acquires relative distances between the vehicle and other vehicles and obstacles in the vicinity. The acquisition device is also capable of acquiring the shape of the road on which the vehicle is traveling and recognizing lanes. The driving assist device 20 includes a route creating unit that creates a traveling route along which the vehicle travels automatically using the information acquired by the acquisition device.

The controller 10 includes an anomaly detecting unit 11 and a control unit 12, which are functional units. The anomaly detecting unit 11 executes an anomaly detecting process for detecting anomalies of the front-wheel steering device 91 and the rear-wheel steering device 92. The control unit 12 controls the front-wheel steering device 91, the rear-wheel steering device 92, the driving device 93, and the braking device 94. The controller 10 includes a central processing unit (CPU) and a read-only memory (ROM). The ROM of the controller 10 stores various programs that cause the CPU to execute various control processes.

In the anomaly detecting process, the anomaly detecting unit 11 uses a controlled variable calculated to control the front-wheel steering device 91 and the actual steered angle of the front wheels 1F. The anomaly detecting unit 11 determines that there is an anomaly in the front-wheel steering device 91 when the actual steered angle is different from a steered angle corresponding to the controlled variable. Likewise, the anomaly detecting unit 11 determines that there is an anomaly in the rear-wheel steering device 92 when the actual steered angle of the rear wheels 1R is different from a steered angle corresponding to a controlled variable that is calculated to control the rear-wheel steering device 92. The anomaly detecting unit 11 repeatedly executes the anomaly detecting process at specific intervals.

The control unit 12 includes a controlled variable calculating unit 13, which calculates controlled variables for controlling the front-wheel steering device 91, the rear-wheel steering device 92, the driving device 93, and the braking device 94. The control unit 12 generates signals based on the controlled variables calculated by the controlled variable calculating unit 13 and delivers the signals to the respective devices. The front-wheel steering device 91 includes a front-wheel controller that activates an actuator based on the signal delivered by the control unit 12. The rear-wheel steering device 92 includes a rear wheel controller that activates an actuator based on the signal delivered by the control unit 12. The driving device 93 includes a driving force controller that controls the internal combustion engine and the transmission based on the signal delivered by the control unit 12. The braking device 94 includes a braking controller that activates an actuator based on the signal delivered by the control unit 12.

The control unit 12 performs autonomous driving to control acceleration/deceleration and steering of the vehicle automatically. For example, the control unit 12 starts the autonomous driving when the driver of the vehicle turns on a switch for starting the autonomous driving. When starting the autonomous driving, the control unit 12 causes the driving assist device 20 to create a traveling route. During the autonomous driving, the control unit 12 causes the controlled variable calculating unit 13 to calculate controlled variables based on the traveling route created by the driving assist device 20. The vehicle is controlled based on the calculated controlled variables, so that the vehicle travels without being operated by the driver. In the following description, automatic control involving turning of the vehicle will be referred to as automatic turning control.

When performing the automatic turning control, the control unit 12 executes a process for selecting devices to be activated in accordance with the state of the front-wheel steering device 91 and the state of the rear-wheel steering device 92. This process will now be described with reference to FIGS. 2 to 5. The ROM of the controller 10 stores control programs for executing the processes shown in FIGS. 2 to 5.

The processes shown in FIGS. 2 to 5 are implemented by the CPU executing the control programs stored in the ROM.

Figure 2:
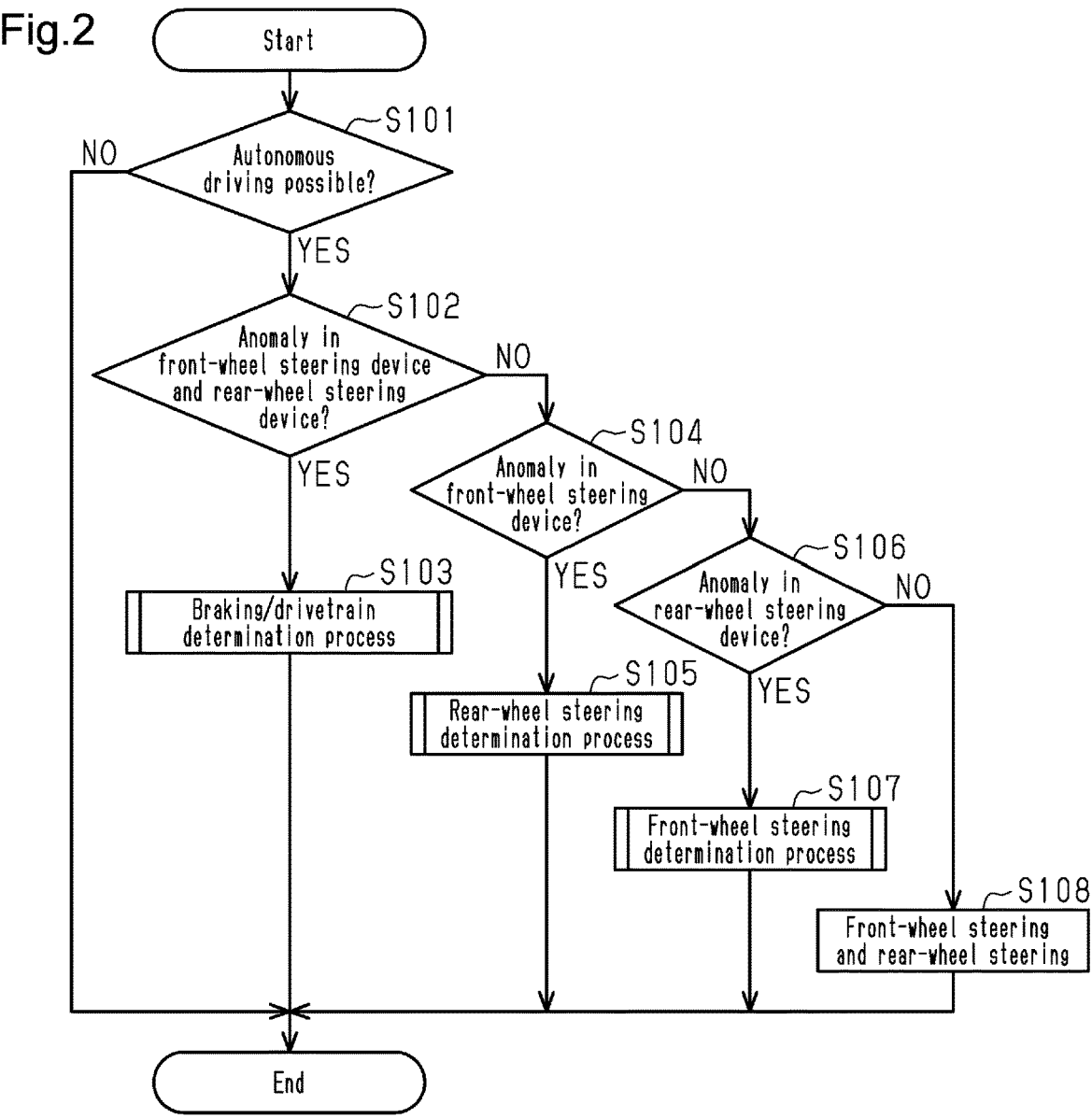
FIG. 2 is a flowchart showing a procedure of processes executed by the controller shown in FIG. 1.

FIG. 2 shows a procedure of processes executed by the control unit 12. This processing routine is repeatedly executed at a specific interval.

When this processing routine is started, the control unit 12 determines whether autonomous driving can be performed in step S101. The control unit 12 determines that the autonomous driving can be performed if the driving assist device 20 has created a traveling route. It is also possible to determine that the autonomous driving is possible when the vehicle driver has requested the autonomous driving. When the autonomous driving is not possible (S101: NO), the control unit 12 ends the current processing routine. When the autonomous driving is possible (S101: YES), the control unit 12 advances the process to step S102.

In step S102, the control unit 12 determines whether there is an anomaly in both the front-wheel steering device 91 and the rear-wheel steering device 92. The control unit 12 determines that there is an anomaly in both the front-wheel steering device 91 and the rear-wheel steering device 92 when the anomaly detecting unit 11 has detected an anomaly in both the front-wheel steering device 91 and the rear-wheel steering device 92. When an anomaly of the front-wheel steering device 91 and an anomaly of the rear-wheel steering device 92 are not detected (S102: NO), the control unit 12 advances the process to step S104.

In step S104, the control unit 12 determines whether there is an anomaly in the front-wheel steering device 91. When an anomaly of the front-wheel steering device 91 is not detected (S104: NO), the control unit 12 advances the process to step S106.

In step S106, the control unit 12 determines whether there is an anomaly in the rear-wheel steering device 92. If an anomaly is not detected in the rear-wheel steering device 92 (S106: NO), the control unit 12 advances the process to step S108.

In step S108, the control unit 12 chooses to perform the automatic turning control through front-wheel steering and rear-wheel steering. Thereafter, the control unit 12 ends the current processing routine. In this case, the control unit 12 activates the front-wheel steering device 91 and the rear-wheel steering device 92 in the automatic turning control, thereby adjusting the steered angle of the front wheels 1F and the steered angle of the rear wheels 1R, so that the vehicle turns.

When determining that there is an anomaly in both the front-wheel steering device 91 and the rear-wheel steering device 92 in the process of S102 (S102: YES), the control unit 12 advances the process to step S103. In step S103, the control unit 12 executes a braking/drivetrain determination process. After ending the braking/drivetrain determination process, the control unit 12 ends the current processing routine.

Figure 3:
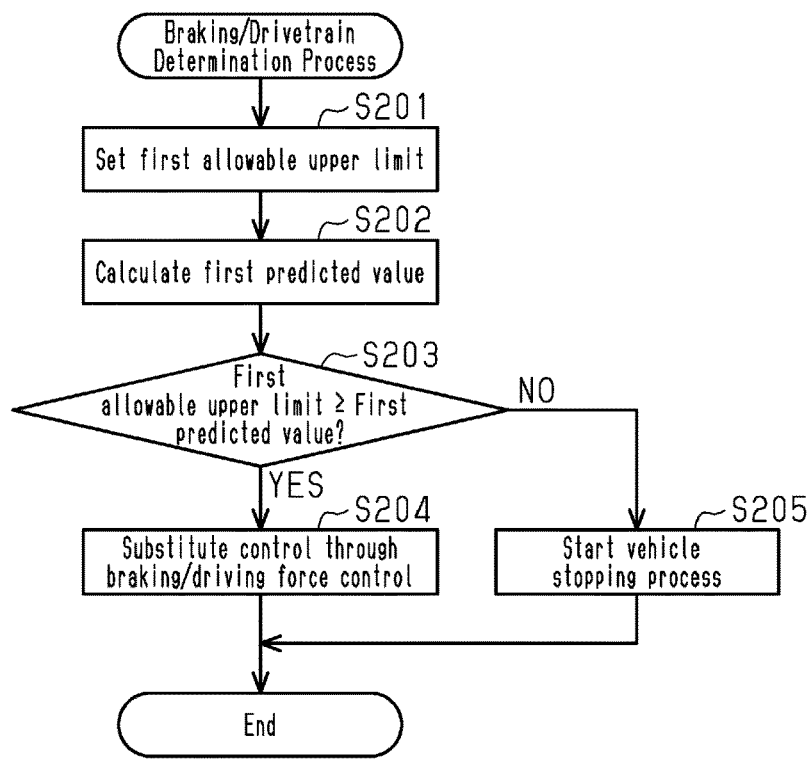
FIG. 3 is a flowchart showing a procedure of processes executed by the controller shown in FIG. 1.

The braking/drivetrain determination process executed by the control unit 12 will now be described with reference to FIG. 3. This processing routine is performed by the process of step S103 shown in FIG. 2. The braking/drivetrain determination process determines whether to activate the driving device 93 and the braking device 94 in place of the front-wheel steering device 91 and the rear-wheel steering device 92 in which an anomaly has been detected. When the driving device 93 and the braking device 94 are activated in place of the front-wheel steering device 91 and the rear-wheel steering device 92, acceleration/deceleration of the left and right wheels is regulated to assist turning. Also, when the braking device 94 is activated to apply braking force to the wheels, the load on the vehicle body is shifted. Such shifting of the load can be used to assist turning of the vehicle. Control of the driving device 93 and/or the braking device 94 in order to regulate acceleration/deceleration of the wheels and shifting of a load on the vehicle will be referred to as braking/driving force control.

When this processing routine is started, the control unit 12 first sets, in step S201, a first allowable upper limit, which is used to determine whether an excessive load will be applied to the braking device 94. The first allowable upper limit is a threshold for determining whether the load on the braking device 94 is allowable. The control unit 12 sets the first allowable upper limit to the longest activation time for which the braking device 94 can be activated continuously. For example, if the temperature of the frictional member of a friction braking device is excessively high, the braking force that can be produced may be reduced. The longer the activation time of the braking device 94, the higher the temperature of the frictional member becomes. Thus, the load on the braking device 94 can be measured using the activation time of the braking device 94 as an index. After setting the first allowable upper limit, the control unit 12 advances the process to step S202.

In step S202, the control unit 12 calculates a first predicted value. The first predicted value is a load that will be applied to the braking device 94 if the vehicle is caused to travel along the traveling route through activation of the driving device 93 and the braking device 94 in place of the front-wheel steering device 91 and the rear-wheel steering device 92. For example, the control unit 12 predicts time for which the braking device 94 is activated based on the traveling route, the vehicle speed, and the like, and sets the first predicted value to the predicted time. After calculating the first predicted value, the control unit 12 advances the process to step S203.

In step S203, the control unit 12 determines whether the first predicted value is less than or equal to the first allowable upper limit. If the first predicted value is less than or equal to the first allowable upper limit (S203: YES), the control unit 12 advances the process to step S204.

In step S204, the control unit 12 chooses to perform a substitute control through the braking/driving force control. Thereafter, the control unit 12 ends the current processing routine. That is, in the automatic turning control, the control unit 12 activates the driving device 93 and the braking device 94 as substitute devices in place of the front-wheel steering device 91 and the rear-wheel steering device 92. As a result, when the automatic turning control is performed, the driving device 93 and the braking device 94 are activated in place of the front-wheel steering device 91 and the rear-wheel steering device 92 in which an anomaly has been detected, so that the vehicle turns. Specifically, the vehicle is controlled to follow the traveling route through acceleration/deceleration of the wheels and shifting of the load on the vehicle.

If the first predicted value is greater than the first allowable upper limit in step S203 (S203: NO), the control unit 12 advances the process to S205. In step S205, the control unit 12 starts a vehicle stopping process. The vehicle stopping process is a process that stops the vehicle and ends the autonomous driving. In one example of the vehicle stopping process, the control unit 12 stops the vehicle after displacing the vehicle to a road shoulder based on the information from the driving assist device 20. In this manner, the vehicle stopping process stops the vehicle after allowing the vehicle to move to a position where the vehicle will not be an obstacle to other vehicles. After executing the vehicle stopping process, the control unit 12 ends the current processing routine.

Referring to FIG. 2, if an anomaly of the front-wheel steering device 91 is detected in the process of step S104 (S104: YES), the control unit 12 advances the process to step S105. In step S105, the control unit 12 executes a rear-wheel steering determination process. After executing the rear-wheel steering determination process, the control unit 12 ends the current processing routine.

Figure 4:
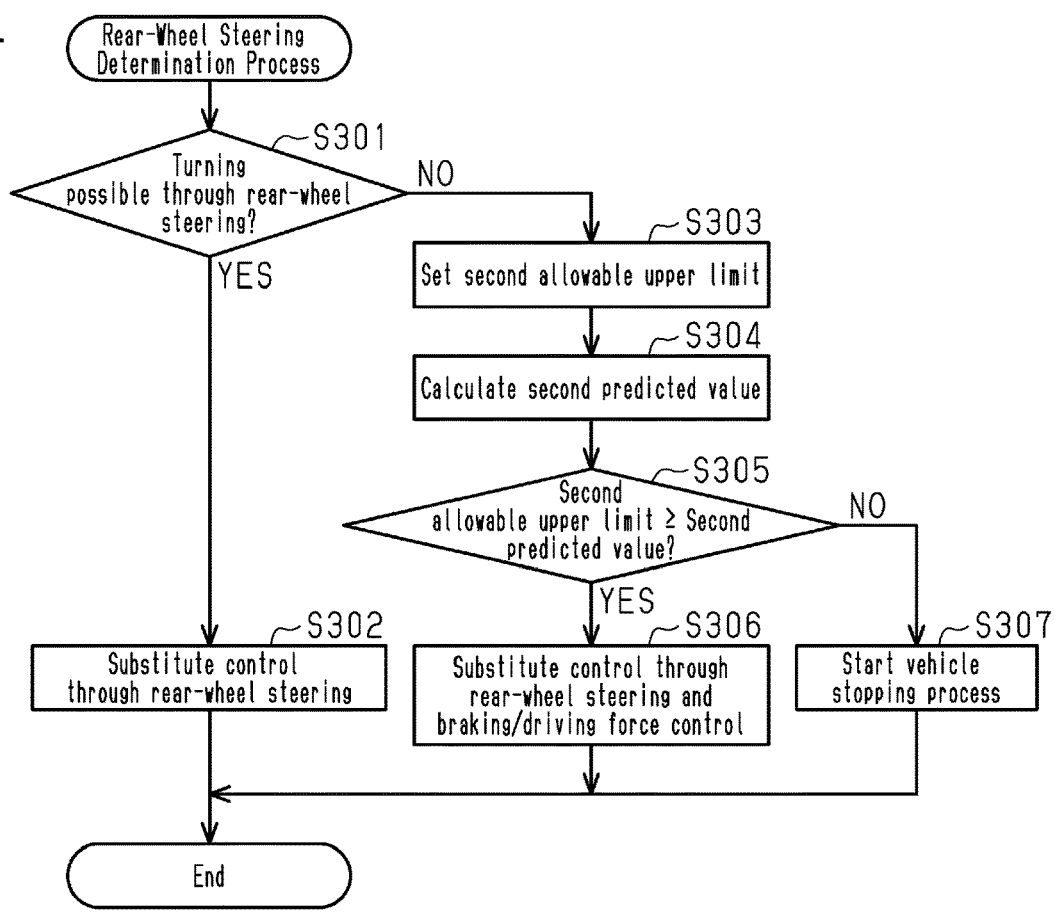
FIG. 4 is a flowchart showing a procedure of processes executed by the controller shown in FIG. 1.

The rear-wheel steering determination process executed by the control unit 12 will now be described with reference to FIG. 4. This processing routine is performed by the process of step S105 shown in FIG. 2.

When this processing routine is started, the control unit 12 determines whether turning can be performed through the rear-wheel steering in step S301. The control unit 12 determines that turning can be performed through the rear-wheel steering if it is possible to cause the vehicle to reach a target point on the traveling route by controlling the steered angle of the rear wheels 1R, without controlling the steered angle of the front wheels 1F. In contrast, the control unit 12 determines that turning cannot be performed through the rear-wheel steering in a case in which the path of the vehicle is predicted to deviate from the traveling route and the vehicle cannot reach the target point on the traveling route even if the rear-wheel steering device 92 is activated to maximize the steered angle of the rear wheels 1R.

When turning through the rear-wheel steering is possible (S301: YES), the control unit 12 advances the process to step S302. In step S302, the control unit 12 chooses to perform a substitute control through the rear-wheel steering. That is, in the automatic turning control, the control unit 12 activates the rear-wheel steering device 92 as a substitute device in place of the front-wheel steering device 91 in which an anomaly has been detected. That is, the automatic turning control is performed using only the rear-wheel steering device 92 in which no anomaly is detected. As a result, the steered angle of the rear wheels 1R is controlled, so that the vehicle turns. When choosing to perform the substitute control through the rear-wheel steering, the control unit 12 ends the current processing routine.

When turning through the rear-wheel steering cannot be performed (S301: NO), the control unit 12 advances the process to step S303. In step S303, the control unit 12 sets a second allowable upper limit, which is used to determine whether an excessive load will be applied to the braking device 94. The control unit 12 sets the second allowable upper limit to the longest activation time for which the braking device 94 can be activated continuously. After setting the second allowable upper limit, the control unit 12 advances the process to step S304.

In step S304, the control unit 12 calculates a second predicted value. The second predicted value is a load that will be applied to the braking device 94 if the vehicle is caused to travel along the traveling route through activation of the rear-wheel steering device 92, the driving device 93, and the braking device 94. For example, the control unit 12 predicts time for which the braking device 94 is activated based on the traveling route, the vehicle speed, and the like, and sets the second predicted value to the predicted time. After calculating the second predicted value, the control unit 12 advances the process to step S305.

In step S305, the control unit 12 determines whether the second predicted value is less than or equal to the second allowable upper limit. If the second predicted value is less than or equal to the second allowable upper limit (S305: YES), the control unit 12 advances the process to step S306.

In step S306, the control unit 12 chooses to perform a substitute control through the rear-wheel steering and the braking/driving force control. That is, in the automatic turning control, the control unit 12 activates the rear-wheel steering device 92, the driving device 93, and the braking device 94 as substitute devices. As a result, when the automatic turning control is performed, the rear-wheel steering device 92, the driving device 93, and the braking device 94 are activated in place of the front-wheel steering device 91 in which an anomaly has been detected, so that the vehicle is caused to turn. Specifically, the vehicle is controlled to follow the traveling route through acceleration/deceleration of the wheels and shifting of the load on the vehicle, in addition to control of the steered angle of the rear wheels 1R. When choosing to perform the substitute control through the rear-wheel steering and the braking/driving force control, the control unit 12 ends the current processing routine.

If the second predicted value is greater than the second allowable upper limit in step S305 (S305: NO), the control unit 12 advances the process to S307. In step S307, the control unit 12 starts a vehicle stopping process. The contents of the vehicle stopping process are similar to those of the vehicle stopping process in step S205. After executing the vehicle stopping process, the control unit 12 ends the current processing routine.

Referring to FIG. 2, if an anomaly of the rear-wheel steering device 92 is detected in the process of step S106 (S106: YES), the control unit 12 advances the process to step S107. In step S107, the control unit 12 executes a front-wheel steering determination process. After executing the front-wheel steering determination process, the control unit 12 ends the current processing routine.

Figure 5:
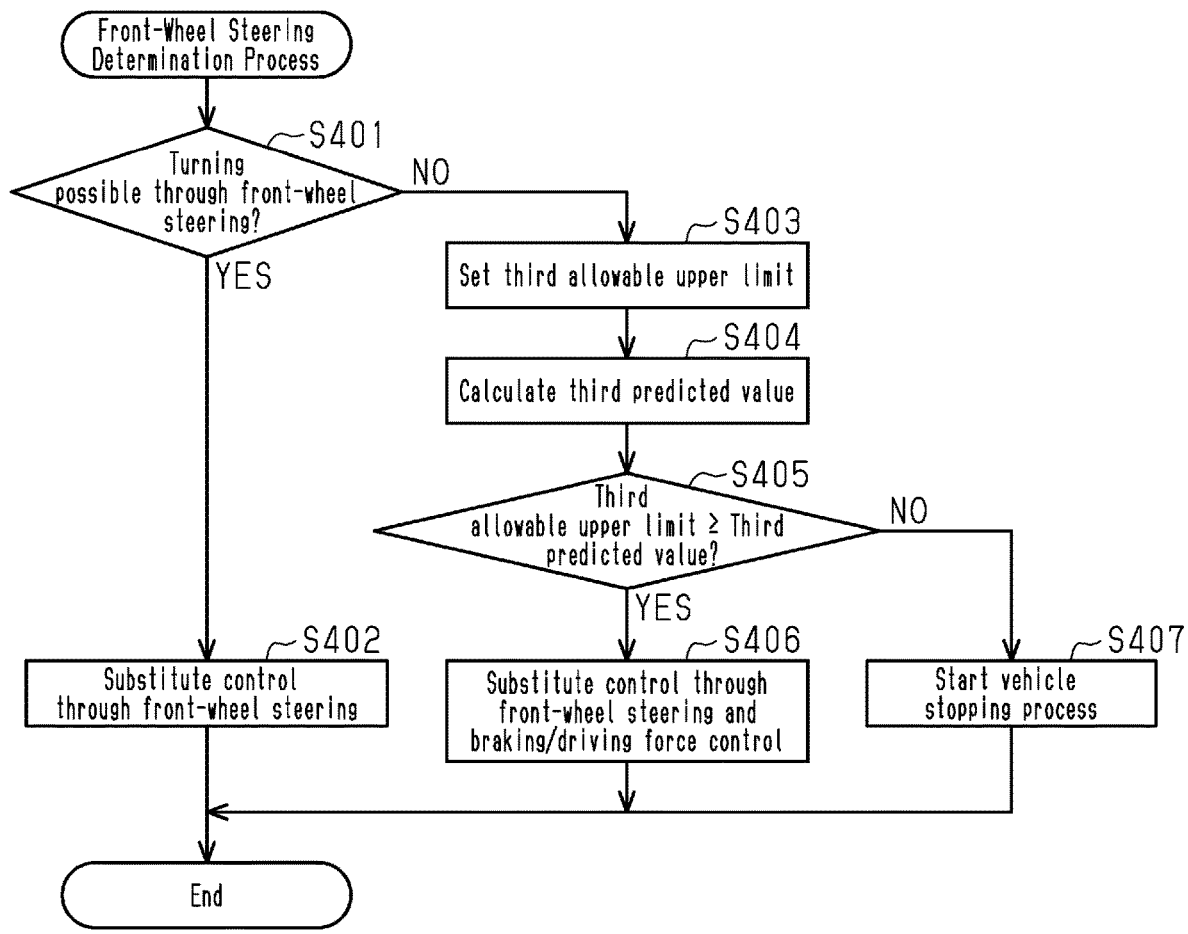
FIG. 5 is a flowchart showing a procedure of processes executed by the controller shown in FIG. 1.

The front-wheel steering determination process executed by the control unit 12 will now be described with reference to FIG. 5. This processing routine is performed by the process of step S107 shown in FIG. 2.

When this processing routine is started, the control unit 12 determines whether turning can be performed through the front-wheel steering in step S401. The control unit 12 determines that turning can be performed through the front-wheel steering if it is possible to cause the vehicle to reach a target point on the traveling route by controlling the steered angle of the front wheels 1F, without controlling the steered angle of the rear wheels 1R. In contrast, the control unit 12 determines that turning cannot be performed through the front-wheel steering in a case in which the path of the vehicle is predicted to deviate from the traveling route and the vehicle cannot reach the target point on the traveling route even if the front-wheel steering device 91 is activated to maximize the steered angle of the front wheels 1F.

When turning through the front-wheel steering is possible (S401: YES), the control unit 12 advances the process to step S402. In step S402, the control unit 12 chooses to perform a substitute control through the front-wheel steering. That is, in the automatic turning control, the control unit 12 activates the front-wheel steering device 91 as a substitute device in place of the rear-wheel steering device 92 in which an anomaly has been detected. That is, the automatic turning control is performed using only the front-wheel steering device 91 in which no anomaly is detected. As a result, the steered angle of the front wheels 1F is controlled, so that the vehicle turns. When choosing to perform the substitute control through the front-wheel steering, the control unit 12 ends the current processing routine.

When turning through the front-wheel steering cannot be performed (S401: NO), the control unit 12 advances the process to step S403. In step S403, the control unit 12 sets a third allowable upper limit, which is used to determine whether an excessive load will be applied to the braking device 94. The control unit 12 sets the third allowable upper limit to the longest activation time for which the braking device 94 can be activated continuously. After setting the third allowable upper limit, the control unit 12 advances the process to step S404.

In step S404, the control unit 12 calculates a third predicted value. The third predicted value is a load that will be applied to the braking device 94 if the vehicle is caused to travel along the traveling route through activation of the front-wheel steering device 91, the driving device 93, and the braking device 94. For example, the control unit 12 predicts time for which the braking device 94 is activated based on the traveling route, the vehicle speed, and the like, and sets the third predicted value to the predicted time. After calculating the third predicted value, the control unit 12 advances the process to step S405.

In step S405, the control unit 12 determines whether the third predicted value is less than or equal to the third allowable upper limit. If the third predicted value is less than or equal to the third allowable upper limit (S405: YES), the control unit 12 advances the process to step S406.

In step S406, the control unit 12 chooses to perform a substitute control through the front-wheel steering and the braking/driving force control. That is, in the automatic turning control, the control unit 12 activates the front-wheel steering device 91, the driving device 93, and the braking device 94 as substitute devices. As a result, when the automatic turning control is performed, the front-wheel steering device 91, the driving device 93, and the braking device 94 are activated in place of the rear-wheel steering device 92 in which an anomaly has been detected, so that the vehicle is caused to turn. Specifically, the vehicle is controlled to follow the traveling route through acceleration/deceleration of the wheels and shifting of the load on the vehicle, in addition to control of the steered angle of the front wheels 1F. When choosing to perform the substitute control through the front-wheel steering and the braking/driving force control, the control unit 12 ends the current processing routine.

If the third predicted value is greater than the third allowable upper limit in step S405 (S405: NO), the control unit 12 advances the process to S407. In step S407, the control unit 12 starts a vehicle stopping process. The contents of the vehicle stopping process are similar to those of the vehicle stopping process in step S205. After executing the vehicle stopping process, the control unit 12 ends the current processing routine.

An operation and advantages of the present embodiment will now be described.

When the front-wheel steering device 91 and the rear-wheel steering device 92 are functioning normally, the controller 10 performs the automatic turning control through the front-wheel steering and the rear-wheel steering (S108). Accordingly, the vehicle is caused to turn through the control of the steered angle of the front wheels 1F and the control of the steered angle of the rear wheels 1R.

Also, when an anomaly of the front-wheel steering device 91 and an anomaly of the rear-wheel steering device 92 are both detected (S102: YES), the controller 10 determines whether the braking device 94 will receive an excessive load if the vehicle is caused to travel along the traveling route through activation of the driving device 93 and the braking device 94 (S203).

When determining that the first predicted value is less than or equal to the first allowable upper limit, and the load on the braking device 94 is not excessive (S203: YES), the controller 10 activates the driving device 93 and the braking device 94 as the substitute devices in place of the front-wheel steering device 91 and the rear-wheel steering device 92 (S204). Accordingly, even when the steered angle cannot be easily changed as compared to a case in which there is no anomaly in the steering device or when the steered angle cannot be changed, the vehicle can be caused to turn by controlling acceleration/deceleration of the wheels and shifting of the load on the vehicle. That is, even if there is an anomaly in both the front-wheel steering device 91 and the rear-wheel steering device 92, the automatic turning control can be continued.

When the automatic turning control is continued by activating the driving device 93 and the braking device 94 as substitute devices, the braking device 94 is activated in a range in which the load on the braking device 94 does not exceed the first allowable upper limit. Thus, the braking device 94 does not receive an excessive load. That is, when the automatic turning is continued by activating the braking device 94 as a substitute, braking force is applied to the wheels without diminishing the performance of the braking device 94.

Further, when an anomaly is detected in one of the front-wheel steering device 91 and the rear-wheel steering device 92 (S104: YES or S106: YES), the controller 10 determines whether the vehicle can reach the target point through activation of the steering device in which an anomaly has not been detected (S301, S401).

If the vehicle can reach the target point through activation of the steering device in which the anomaly has not been detected (S301: YES or S401: YES), the controller 10 is capable of continuing the automatic steering by activating the steering device in which an anomaly has not been detected (S302, S402). Instead of performing turning through steering of the four wheels, turning can be performed through steering of the front wheels 1F or steering of the rear wheels 1R. The braking device 94 is thus not activated for turning. This suppresses an increase in the load on the braking device 94. Also, the turning does not involve activation of the driving device 93 and the braking device 94 as substitute devices. Thus, changes in the speed of the vehicle during turning are reduced as compared to a case in which there is no anomaly in both the front-wheel steering device 91 and the rear-wheel steering device 92 and turning is performed through steering of the four wheels.

The steering performance of the vehicle achieved by steering the front wheels 1F or the rear wheels 1R is different from the steering performance achieved by steering the four wheels. Thus, if the traveling route is created on the assumption that the four wheels will be steered, the path of the vehicle may be deviated from the traveling route if only the steering device in which an anomaly is not detected is activated.

In this regard, if the activation of only the steering device in which an anomaly has not been detected cannot prevent the position of the vehicle from deviating from the target point (S301: NO or S401: NO), the controller 10 activates the driving device 93 and the braking device 94 in addition to the steering device in which an anomaly has not occurred, thereby continuing the automatic turning (S306, S406). Therefore, the vehicle is controlled to follow the traveling route through acceleration/deceleration of the wheels and shifting of the load on the vehicle in addition to the control of the steered angle by activation of the steering device in which an anomaly has not been detected. Further, the activation of the steering device in which an anomaly has not been detected changes the steered angle of the corresponding wheels. Thus, as compared to a case in which turning is performed by the driving device 93 or the braking device 94 without changing the steered angles of the front wheels 1F and the rear wheels 1R, the load on the braking device 94, which is activated as a substitute device, is reduced.

Also, in a case in which the driving device 93 and the braking device 94 are activated in addition to the steering device in which an anomaly has not been detected, the braking device 94 is activated in a range in which the load on the braking device 94 does not exceed the first allowable upper limit. Thus, the braking device 94 does not receive an excessive load even if the automatic turning is continued by activating the braking device 94 as a substitute device.

Further, when the second predicted value is greater than the second allowable upper limit or when the third predicted value is greater than the third allowable upper limit (S203: NO, S305: NO, or S405: NO), the controller 10 executes the vehicle stopping process (S205, S307, S407). Thus, when the load on the braking device 94 is likely to be excessive by exceeding the second allowable upper limit or the third allowable upper limit, the braking device 94 is not selected as a substitute device. That is, the braking device 94 is not activated in such a manner that the load on the braking device 94 exceeds the second allowable upper limit or the third allowable upper limit. This prevents the load on the braking device 94 from being excessive and prevents the performance of the braking device 94 from being diminished. In the vehicle stopping process, since the vehicle is stopped after being displaced, the stopped vehicle is prevented from being an obstacle to other vehicles.

"An allowable range that is a set of values of a load allowable to the substitute device" in the above SUMMARY section corresponds to the range up to the first allowable upper limit. The process that "performs the automatic turning control by controlling the substitute device when an allowable range that is a set of values of a load allowable to the substitute device includes the predicted value" in the above SUMMARY section corresponds to the process of step S204.

The braking device 94 and the driving device 93, which are activated when an anomaly of the front-wheel steering device 91 and an anomaly of the rear-wheel steering device 92 are both detected, can be regarded as the first substitute devices.

One of the front-wheel steering device 91 and the rear-wheel steering device 92 is the first steering device, and the other is the second steering device. The process of step S301 and step S401 is a process that "determines whether the vehicle can be caused to reach the target point on the traveling route if the automatic turning control is performed by controlling only the second steering device in a case in which an anomaly of the second steering device is not detected but an anomaly of the first steering device is detected."

The process that performs the automatic turning control by activating the substitute device selected in step S306 or step S406 is a process that "performs the automatic turning control by controlling the second steering device and the substitute device when determining that the vehicle cannot be caused to reach the target point." In this case, the combination of the substitute device, which is at least one of the braking device 94 and the driving device 93, and the second steering device can be regarded as the second substitute device, which is activated in place of the first steering device.

The process that performs the automatic turning control by activating the substitute device that has been selected in S302 or step S402 is a process that "performs the automatic turning control by controlling the second steering device when determining that the vehicle can be caused to reach the target point." In this case, the second steering device can be regarded as the third substitute device, which is activated in place of the first steering device.

The above-described embodiment may be modified as follows. The above-described embodiment and the following modifications can be combined as long as the combined modifications remain technically consistent with each other.

The process of step S204 in the above-described embodiment activates the driving device 93 and the braking device 94 as substitute devices in place of the front-wheel steering device 91 and the rear-wheel steering device 92. Even if there is an anomaly in a steering device, the steering device may be able to change the steered angle of the wheels even to a small extent. In such a case, it is possible to continue the automatic turning control by allowing the steering device to change the steered angle within the range to that extent and activating the substitute device to compensate for the difference between the demanded steered angle and the actual steered angle.

The same applies to the processes of steps S302, S306, S402, and S406. That is, the steering device in which an anomaly has been detected may be activated within the range in which the steering device can be controlled.

Regarding the load on braking device 94, the above-described embodiment determines whether the first to third predicted values are respectively less than or equal to the first to third allowable upper limits. Instead, an allowable upper limit related to the driving device 93 may be set, and a predicted value of the load on the driving device 93 may be calculated. It is determined whether the predicted value is less than or equal to the allowable upper limit. The load on the driving device 93 can be measured using the number of revolutions or the torque of the internal combustion engine as an index.

The above-described embodiment is configured to choose to activate the driving device 93 and the braking device 94 as the substitute devices in the process of step S204, so as to regulate the acceleration/deceleration of the wheels and shifting of the load on the vehicle. Instead, at least one of the driving device 93 and the braking device 94 may be activated so as to regulate the acceleration/deceleration of the wheels and shifting of the load on the vehicle. When the substitute devices do not include the braking device 94, determination may be performed using the load on the driving device 93 as in the above-described modification.

The process of step S306 may choose to activate, as the substitute device, the combination of at least one of the driving device 93 and the braking device 94, and the rear-wheel steering device 92.

The process of step S406 may choose to activate, as the substitute device, the combination of at least one of the driving device 93 and the braking device 94, and the front-wheel steering device 91.

The first allowable upper limit, which is set in the process of step S201, may be set in the following manner. Regarding the frictional member of the friction braking device, the first allowable upper limit may be set to the maximum value of a temperature range of the frictional member in which the braking force is unlikely to be lowered. The relationship between the braking force and the temperature of the frictional member varies depending on the materials of the frictional member and the rotor.

In a case in which the first allowable upper limit is set as in the above-described configuration, the process of step S202 calculates the temperature of the frictional member as the first predicted value. The temperature of the frictional member can be detected by a temperature sensor. Alternatively, the temperature of the frictional member can be calculated based on the amount of fluctuation of the vehicle speed, the braking distance, and the like. The first allowable upper limit may be set using the temperature of the rotor instead of the temperature of the frictional member.

As described above, the load on the braking device 94 can be calculated without using the activation time of the braking device 94 as an index.

This modification related to the first allowable upper limit can be applied to the second allowable upper limit and the third allowable upper limit, which are set in the processes of step S303 and step S403.

The first allowable upper limit set in the process of step S201, the second allowable upper limit set in the process of step S303, and the third allowable upper limit set in the process of step S403 may be the same or different from one another.

As one example, the second allowable upper limit and the third allowable upper limit may be greater than the first allowable upper limit. In this case, when one of the steering devices is functioning normally, the vehicle stopping process is unlikely to be executed. That is, the automatic turning control is likely to be continued.

Another example assumes that the vehicle turns more easily when the front wheels 1F are steered than when the rear wheels 1R are steered. In this case, the load on the braking device 94 tends to be greater when the rear-wheel steering device 92 and the braking device 94 are used as the substitute devices than when the front-wheel steering device 91 and the braking device 94 are used as the substitute devices. The allowable upper limits may be adjusted based on this tendency.

Steps S303, S304, S305, and S307 may be omitted from the rear-wheel steering determination process described with reference to FIG. 4. In this case, the control unit 12 advances the process to step S306 when turning cannot be performed through the rear-wheel steering (S301: NO).

Likewise, steps S403, S404, S405, and S407 may be omitted from the front-wheel steering determination process described with reference to FIG. 5.

When one of the front-wheel steering device 91 and the rear-wheel steering device 92 functions normally, the load on the braking device 94 is unlikely to be increased even if turning is performed through control of the steered angle by the normally functioning steering device and the braking/driving force. Thus, the load on the braking device 94 is unlikely to be increased even if the process that determines whether to execute the stopping process and the stopping process are omitted as in the above-described configuration.

In the above-described embodiment, the first to third allowable upper limits related to time are compared with the first to third predicted values, so as to determine whether the load on the braking device 94 will increase. Instead, whether the load on the braking device 94 will increase may be determined based on a two-dimensional map in which the horizontal axis represents the temperature of the frictional member, and the vertical axis represents the activation time of the braking device 94. In this case, an area that is less than or equal to the allowable upper limit of the temperature and less than or equal to the allowable upper limit of the time is an allowable range. When a predicted value is not within the allowable range, the vehicle stopping process is executed. This prevents the load on the braking device 94 from being excessive in the automatic turning control as in the case of the above-described embodiment.

The braking device 94 may be a regenerative braking device, which applies regenerative braking force to the wheels. In a vehicle equipped with a regenerative braking device, a battery is charged with electricity generated through application of regenerative braking force to the wheels. In such a vehicle, when electricity that would cause the state of charge of the battery to exceed a defined value is generated, the regenerative braking may be restricted. That is, the regenerative braking may be restricted when the load on the regenerative braking device increases. Thus, when the automatic turning control is continued by using a regenerative braking device as the substitute device, the regenerative braking device is activated within a range in which the load on the regenerative braking device does not exceed the allowable upper limit, so that braking force is applied to the wheels without diminishing the performance of the regenerative braking device. The time for which activation of the regenerative braking device is continued or the state of charge of the battery may be used as an index of the load on the regenerative braking device.

In the vehicle stopping process, if no obstacles or other vehicles are present in the vicinity, the vehicle may be stopped without being displaced.

In place of the vehicle stopping process, a suppression process, which will be discussed below, may be executed. The suppression process minimizes the braking force generated by the braking device 94, such that the load on the braking device 94 does not exceed the allowable upper limit when the automatic turning control is performed. For example, the load on the braking device 94 can be reduced by shortening the time for which the braking device 94 is activated or reducing the force with which the frictional member is pressed against the rotor. When the suppression process is executed in place of the vehicle stopping process, the automatic turning control can be continued while reducing the load on the braking device 94.

The vehicle stopping process may be executed after the suppression process of the above-described modification is executed to continue the automatic turning control. For example, the vehicle stopping process may be executed when a defined time has elapsed from when the suppression process is started.

In the above-described embodiment, the vehicle includes the front-wheel steering device 91 and the rear-wheel steering device 92. However, the present disclosure may be used in a vehicle that is not equipped with a four-wheel steering mechanism. For example, an example assumes that the controller 10 is mounted on a vehicle in which the front wheels 1F are steered wheels. In this configuration, the vehicle stopping process is executed when there is an anomaly in the front-wheel steering device, and the load on the braking device 94 is predicted to be excessive. This prevents the load on the braking device 94 from being excessive in the automatic turning control, as in the case of the above-described embodiment.

In the above-described embodiment, the present disclosure is employed in a vehicle equipped with four wheels. However, the number of wheels is not limited to four.

Wheel hub motors, which are driving motors attached to the respective wheels, may be employed as the drive source of the driving device 93. The driving force on the respective wheels can be regulated separately by controlling the driving motors. The wheel hub motors may be used as regenerative braking devices.

In the above-described embodiment, the braking device 94 is capable of separately changing the braking force applied to the respective wheels. The braking force applied to the respective wheels does not necessarily need to be controlled separately. However, the braking force is preferably at least capable of changing the braking force applied to the left wheels and the right wheels, separately.

The controller 10, the front-wheel controller, the rear-wheel controller, the drive controller, the braking controller, and the route creating unit of the driving assist device 20, which are processing circuitry, may have any one of the configurations (a) to (c) listed below.

(a) Circuitry including one or more processors that execute various processes according to computer programs. The processor includes a CPU and a memory such as RAM and ROM. The memory stores program code or instructions configured to cause the CPU to execute processes. The memory, which is a computer-readable medium, includes any type of media that are accessible by general-purpose computers and dedicated computers.

(b) Circuitry including one or more dedicated hardware circuits that execute various processes. The dedicated hardware circuits include, for example, an application specific integrated circuit (ASIC) and a field programmable gate array (FPGA).

(c) Circuitry including a processor that executes part of various processes according to programs and a dedicated hardware circuit that executes the remaining processes.

The controller 10 may have part or all of the functions of the route creating unit of the driving assist device 20.

The controller 10 may have part or all of the functions of the front-wheel controller, the rear-wheel controller, the drive controller, and the braking controller.

In this specification, "at least one of A and B" should be understood to mean "only A, only B, or both A and B."

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a vehicle, the vehicle including a wheel, a driving device that transmits a driving force to the wheel, a steering device that controls a steered angle of the wheel, and a braking device that applies a braking force to the wheel, the controller comprising processing circuitry configured to execute:
    an anomaly detecting process that detects an anomaly of the steering device; and
    a process that performs an automatic turning control that causes the vehicle to turn automatically along a traveling route, wherein
    each of the braking device and the driving device is a substitute device configured to be activated in place of the steering device,
    the process that performs the automatic turning control includes performing the automatic turning control by controlling the steering device when an anomaly of the steering device is not detected, and
    the process that performs the automatic turning control includes, when an anomaly of the steering device is detected;
    setting, as an allowable upper limit, the longest activation time for which the braking device can be activated continuously,
    predicting only time for which the braking device of the braking device and the driving device is activated on an assumption that the automatic turning control is performed by activating both the braking device and the driving device, and setting a predicted time as a predicted value, and
    performing the automatic turning control by controlling both the braking device and the driving device when a range up to the allowable upper limit includes the predicted value.

2. The controller for the vehicle according to claim 1, wherein
    the wheel includes a front wheel and a rear wheel,
    the steering device includes a front-wheel steering device that controls a steered angle of the front wheel and a rear-wheel steering device that controls a steered angle of the rear wheel,
    the anomaly detecting process is a process that detects an anomaly of the front-wheel steering device and an anomaly of the rear-wheel steering device,
    the process that performs the automatic turning control includes
    performing the automatic turning control by controlling the front-wheel steering device and the rear-wheel steering device when neither an anomaly of the front-wheel steering device nor an anomaly of the rear-wheel steering device is detected, and
    performing the automatic turning control by controlling both the braking device and the driving device when both an anomaly of the front-wheel steering device and an anomaly of the rear-wheel steering device are detected,
    one of the front-wheel steering device and the rear-wheel steering device is a first steering device, and the other is a second steering device, and
    the process that performs the automatic turning control includes
    determining whether the vehicle can be caused to reach a target point on the traveling route if the automatic turning control is performed by controlling only the second steering device in a case in which an anomaly of the second steering device is not detected but an anomaly of the first steering device is detected,
    performing the automatic turning control by controlling the second steering device and both the braking device and the driving device when determining that the vehicle cannot be caused to reach the target point, and
    performing the automatic turning control by controlling the second steering device when determining that the vehicle can be caused to reach the target point.

3. The controller for the vehicle according to claim 1, wherein the process that performs the automatic turning control includes stopping the vehicle when the predicted value is not included in the range up to the allowable upper limit.

4. A non-transitory computer readable medium storing a control program executed by a controller for a vehicle, the vehicle including a wheel, a driving device that transmits a driving force to the wheel, a steering device that controls a steered angle of the wheel, and a braking device that applies a braking force to the wheel, the control program being configured to cause the controller to execute:
- an anomaly detecting process that detects an anomaly of the steering device; and
- a process that performs an automatic turning control that causes the vehicle to turn automatically along a traveling route, wherein
- each of the braking device and the driving device is a substitute device configured to be activated in place of the steering device,
- the process that performs the automatic turning control includes performing the automatic turning control by controlling the steering device when an anomaly of the steering device is not detected, and
- the process that performs the automatic turning control includes, when an anomaly of the steering device is detected;
- setting, as an allowable upper limit, the longest activation time for which the braking device can be activated continuously,
- predicting only time for which the braking device of the braking device and the driving device is activated on an assumption that the automatic turning control is performed by activating both the braking device and the driving device, and setting a predicted time as a predicted value, and
- performing the automatic turning control by controlling both the braking device and the driving device when a range up to the allowable upper limit includes the predicted value.

5. A control method for a vehicle, the vehicle including a wheel, a driving device that transmits a driving force to the wheel, a steering device that controls a steered angle of the wheel, and a braking device that applies a braking force to the wheel, the control method comprising:
- detecting an anomaly of the steering device; and
- performing an automatic turning control that causes the vehicle to turn automatically along a traveling route, wherein
- each of the braking device and the driving device is a substitute device configured to be activated in place of the steering device,
- the performing the automatic turning control includes causing the vehicle to turn automatically along the traveling route by controlling the steering device when an anomaly of the steering device is not detected, and
- the performing the automatic turning control includes, when an anomaly of the steering device is detected;
- setting, as an allowable upper limit, the longest activation time for which the braking device can be activated continuously,
- predicting only time for which the braking device of the braking device and the driving device is activated on an assumption that the vehicle is caused to turn automatically along the traveling route by activating both the braking device and the driving device, and setting a predicted time as a predicted value, and
- causing the vehicle to turn automatically along the traveling route by controlling both the braking device and the driving device when a range up to the allowable upper limit includes the predicted value.

* * * * *